UNITED STATES PATENT OFFICE.

THOMAS A. EDISON, OF LLEWELLYN PARK, NEW JERSEY.

METHOD OF BRICKING FINE IRON ORES.

SPECIFICATION forming part of Letters Patent No. 485,840, dated November 8, 1892.

Application filed August 24, 1891. Serial No. 403,532. (No specimens.)

*To all whom it may concern:*

Be it known that I, THOMAS A. EDISON, a citizen of the United States, residing at Llewellyn Park, in the county of Essex and State of New Jersey, have invented a certain new and useful Improvement in the Method of Bricking Fine Iron Ores, (Case No. 924,) of which the following is a specification.

The object of the present invention is to produce a cheap and practical process for bricking or lumping fine iron-ore concentrates, so as to render them available for treatment in blast-furnaces to the best advantage and to the whole capacity of the furnace.

The invention consists in mixing with powdered ore, which is previously washed with water to eliminate any phosphate of calcium particles which in the form of dust may be adhering to the particles of iron, lime slaked with hot water in the same manner as is usual in making whitewash, and also mixing with said ore common brick-clay. The quantity of lime and of clay used will depend on the grade or fineness of the ore; but the proportions generally employed with iron concentrates passing through fifty-mesh sieves are fifty pounds of unslaked lime and twenty-five pounds of clay per ton of ore, with sufficient water to make a fine mush capable of flowing down an incline of, say, fifty degrees. The mass is thoroughly mixed and spread in a layer of about an inch in thickness and is permitted to harden or set, which it will do sufficiently in about two days. It is then broken up into pieces about two inches square, and these lumps or bricks are piled in heaps. At intervals—say two or three times a day—the piles are dampened with water. The object of thus dampening the bricks is to cause them to absorb water to dissolve some of the lime in the body of the brick and bring it toward the surface, where it will meet the air, which penetrates to some distance into the brick. The lime will then combine with the carbonic acid of the air and be deposited in a very hard state at the junctures of the iron particles and on said particles. Hence the outer hard shell will increase in thickness and hardness from day to day by the action of the water and air on the lime until the shell is sufficiently thick to give the desired strength to the brick, so that it may be safely handled and transported to the blast-furnace or other place where it is to be used or treated. The object of the clay is to prevent the lump ore from falling to pieces in the furnace, as it would do if the lime only were used. Under the weight of the charge in the furnace and under the effect of the blast as the lime was reburned the brick would crumble and nearly defeat the object of the bricking; but when clay is used as the lime is being burned under the influence of the heat of the furnace the clay becomes harder and increases its power of binding the particles together. It will be evident that other binding materials which under the influence of heat tend to harden or bind together—such as powdered fluor-spar—may be used in connection with the lime; but clay is probably the most available and cheapest material.

The object of using lime in the whitewash form is to minimize the amount of lime required. If it were used in a coarser form, there would be lumps, which would simply fill the voids in the ore and be of no avail, while with the greater fineness of particles when slaked with hot water the whole of the lime is utilized in the best possible manner. After drying the lime is all found at the junctures of the particles of iron and on the surfaces of the particles, leaving the voids free from lime and capable of admitting the necessary air deeply into the body of the brick or lump to produce the required reaction, as above set forth.

By bricking the ore according to this method the erection of special furnaces for treatment of the fine ore concentrates and the expense connected therewith is avoided. The method and the materials employed in the method are simple and inexpensive, and the ore is put in such shape that the final treatment may be performed in an ordinary blast-furnace. In addition to the action already set forth, the lime at the same time acts as a flux to the silica of the ore.

What I claim is—

1. The method of treating fine iron ore, which consists in washing the ore to eliminate phosphorus and mixing with the washed ore a binding material consisting of lime slaked in hot water to form lumps or bricks, substantially as described.

2. The method of lumping fine ore, which consists in mixing lime with the ore, allowing the same to set, and subsequently dampening and drying the same, substantially as described.

3. The method of treating fine ore, which consists in mixing therewith finely-divided lime slaked in hot water, allowing the mixture to set, and subsequently dampening and drying the same, substantially as described.

4. The method of treating fine ore, which consists in mixing therewith clay and finely-divided lime slaked in hot water, allowing the mixture to set, and subsequently dampening and drying the same, substantially as described.

This specification signed and witnessed this 31st day of July, 1891.

THOMAS A. EDISON.

Witnesses:
 JOHN F. RANDOLPH,
 FREDERICH OTT.